Nov. 16, 1943.                A. G. RUSSELL                 2,334,355
                       REINFORCED CONCRETE STRUCTURE
                          Filed Feb. 17, 1941          3 Sheets-Sheet 3

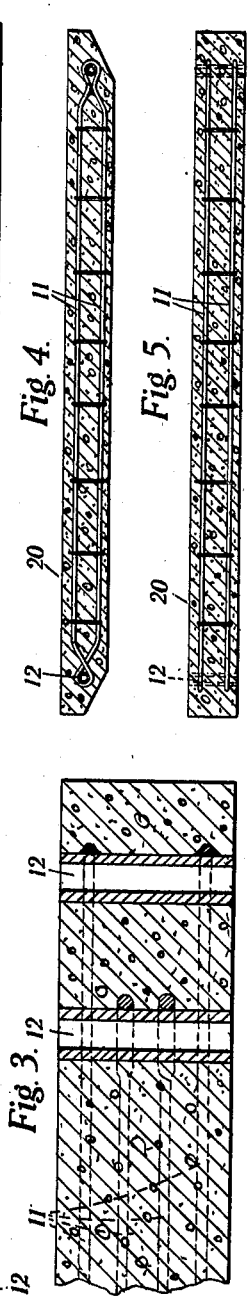

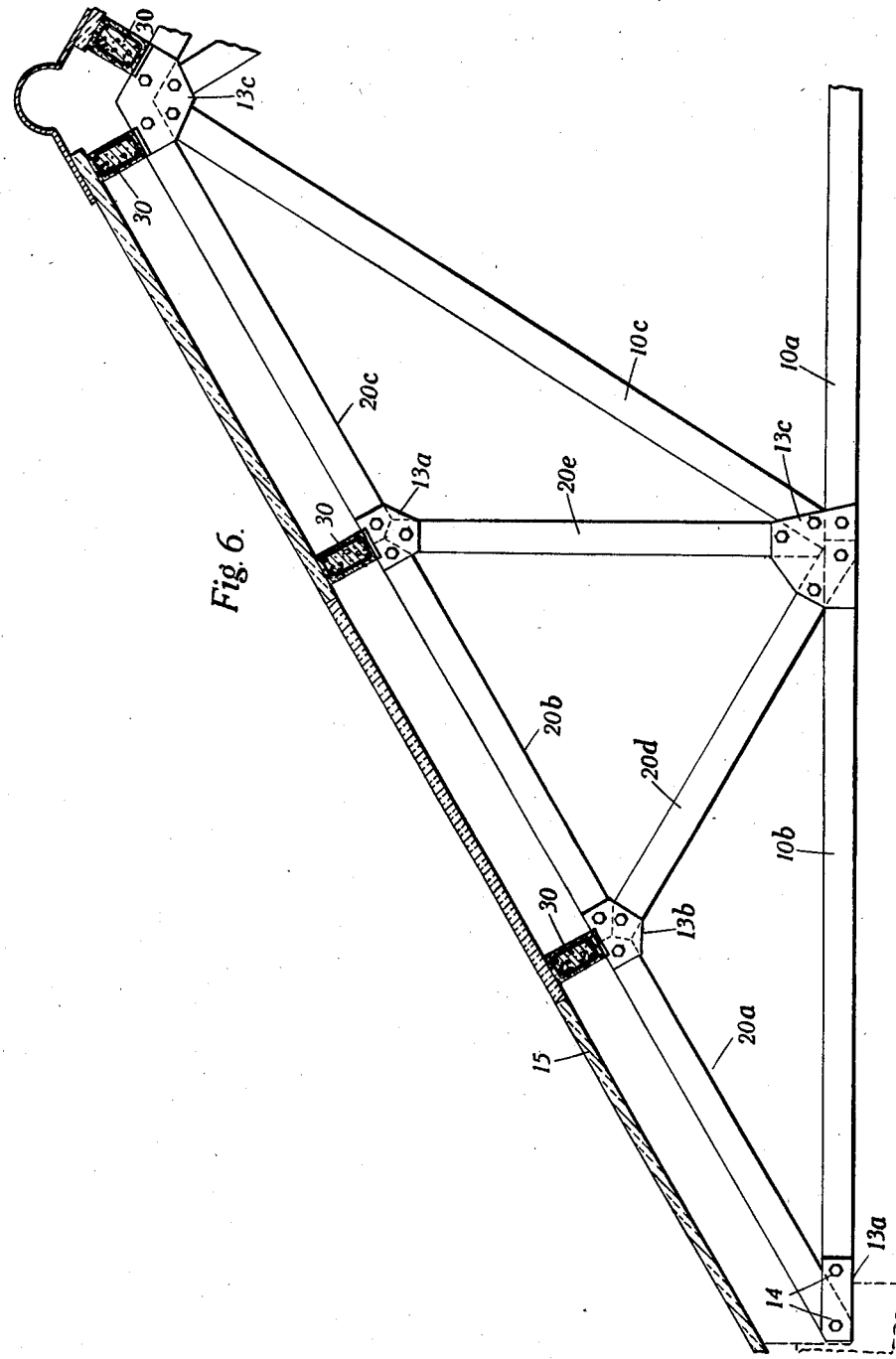

INVENTOR
Arthur G. Russell,
BY
ATTORNEY

Patented Nov. 16, 1943

2,334,355

UNITED STATES PATENT OFFICE 2,334,355

REINFORCED CONCRETE STRUCTURE

Arthur Gerald Russell, Foleshill, Coventry, England

Application February 17, 1941, Serial No. 379,327
In Great Britain February 21, 1940

11 Claims. (Cl. 72—1)

This invention is for improvements in or relating to reinforced concrete structures of lattice-like or triangulated form, in the nature of trusses and girders. Structures of this nature are usually made of steel and difficulties lie in the way of their manufacture from reinforced concrete. For example, if the usual manufacturing methods are applied to their fabrication in reinforced concrete, such structures would be cast in situ with the use of shuttering. This in itself would present substantial difficulty owing to the complex nature of the shuttering required and the quantity of timber involved.

The present invention provides a lattice-like or triangulated structure of reinforced concrete, characterised in that it is built up of a plurality of separate, preformed, reinforced concrete units or elements connected together, to form the desired structure, in such manner that some are adapted to take the tensile stresses and others the compressive stresses developed in the resultant structure when loaded. As will readily be appreciated it is possible so to arrange matters that at least some of the elements employed in this structure are interchangeable. For example any given structure may incorporate a very few different sizes of elements but a great number of elements of each size. These elements may therefore be made in large quantities at a manufacturing centre where the necessary skill and materials are available, and it will be appreciated that only a few simple moulds are necessary.

Preferably, at least some of the preformed elements are transfixed by cast-in tubes which receive bolts, rivets or equivalent members whereby a plurality of the elements are connected together. Advantageously, longitudinal metal reinforcement in the elements may be connected to said cast-in tubes. The joints between the various elements may either be rigid joints or they may be pinned joints.

The invention also includes a method of building up a lattice-like or triangulated load-supporting structure of the nature referred to, which consists in the use of a plurality of elongated preformed reinforced concrete elements at least some of which are interchangeable one with another, and securing said elements together by bolts or the like to form the desired structure in which some of the elements are disposed to take the tensile and others the compressive stresses.

The foregoing and other features of the invention are incorporated in the examples now to be described with reference to the accompanying drawings, in which Figures 1 and 2 are longitudinal sections at right angles to one another through a tensile unit or element;

Figure 3 is a sectional view of one end of an element, illustrating a modification;

Figures 4 and 5 are sections similar to Figs. 1 and 2 through a compression element;

Figure 6 is a sectional elevation of a portion of a roof truss according to this invention;

Figures 7 and 8 are fragmentary sectional elevational views, on a larger scale, of one of the joints therein; while

Figure 7:
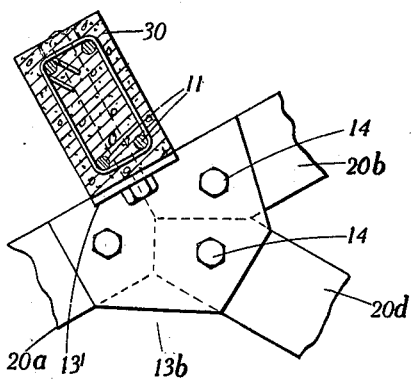

In the preferred construction according to this invention the units or elements 10, Figs. 1 and 2, which are to take the tensile stresses are of the appropriate elongated (post-like) form and are reinforced by longitudinally-extending metal rods 11. Near each end of such a tensile element, however, the lattice is transfixed by at least one metal tube or sleeve 12 to which the longitudinal reinforcement 11 is connected. This connection is preferably achieved by bending the metal rod 11 around the sleeve 12. Thus two sleeves 12 at opposite ends of the element 10 are tied together by means of at least one reinforcement rod 11 which is bent around them and extends between them. This reinforcement is therefore well placed to prevent the separation of the tubes 12 under a tensile load. There may be one tube at one or each end, as shown, or a plurality of tubes. If, for example, there are two spaced tubes 12 at each end the reinforcement 11 connects the two inner tubes together and also connects the two outer tubes together, as illustrated in Fig. 3.

In casting an element of this form the tubes and the reinforcement are set up in the appropriate positions in a mould, which serves as a jig to ensure the correct spacing between the tubes, and the concrete is applied in known manner.

It will be understood that the use of the metal tubes 12 achieves three objects. The said tubes form a permanent connection between all the reinforcement members 11 in the element (and, when said element is bolted to another element, between said attached elements); they permit the loops or bends in the longitudinal reinforcement bars to be of a larger diameter than would otherwise be the case; and they provide holes having a standard or predetermined size and location for fixing purposes. Especially in the tension element, the reinforcement members 11 may be welded to the tubes 12, or their section may be increased in the loops or bends where they extend around the tubes.

Those units or elements 20, Figs. 4 and 5, which are intended to take the compressive stresses are also provided with the transverse metal tubes 12 and the reinforcement 11 may be arranged in a like manner. The reinforcement rods 11, both in the tension and in the compression members, are bound in suitable manner to retain them in their respective positions, as will be appreciated by one skilled in the art. In the compression members 20, following to a certain extent the principle adopted in the construction of what are known as "hinge joints" in reinforced concrete work, the rods 11 are either crossed adjacent to the tubes 12 (as is shown at the left hand end of Fig. 4), or are brought together and welded (as is shown at the right hand end of Fig. 4). It will be noticed that the rods 11 (which may be of square section) are looped around or substantially completely embrace the tubes 12.

In building such units or elements up into the desired triangulated structure the joints are made by the use of steel fish or gusset plates provided with holes at the appropriate positions, and the ends of the various elements that are to be connected at a joint are received between two such plates and suitable bolts or rivets passed through the holes in the plates and through the tubes in the elements.

In the triangulated roof truss shown in Fig. 6, there are tension elements, 10a, 10b, 10c and compression elements 20a—20e, pin jointed together using fish plates 13a—13e and bolts 14 transfixing the tubes 12 and the fish plates. The joint between elements 20a, 20b and 20d is illustrated in detail in Figs. 7 and 8.

Such roof trusses may be connected by purlins 30, forming a support for the roof sheeting (desirably but not necessarily of asbestos cement) 15. These purlins are made in a like manner to the other preformed elements, countersunk holes being preferably provided for the bolt heads or nuts at one face. They are bolted to bent-over portions of the fish plates, as indicated by 13' in Figs. 7 and 8.

Figure 8:
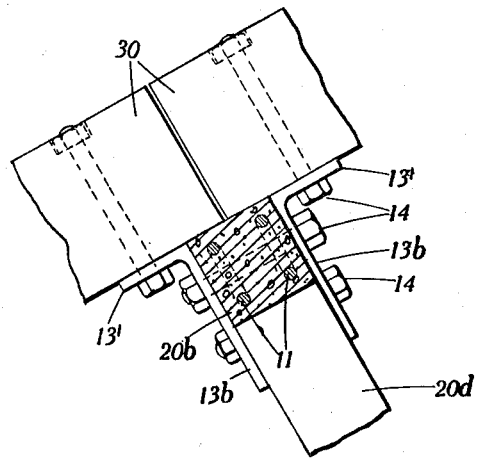

It will be noticed that the ends of the elements 10, 20, of Figs. 6-8 are not all square, but are chamfered. They may be square, or rounded. It may be found desirable in elements (e. g. purlins) subject to a bending movement, to cause the reinforcement rods to converge at the ends, as shown in dotted lines at the left hand end of Fig. 2.

Naturally, the elements 10b, 10c, 20a—20e are duplicated in the other half of the truss, which is therefore not illustrated. A greater degree of interchangeability or identity among the elements may be obtained. For example, certain or all of members 10 or 20 may be identical.

Figure 9:
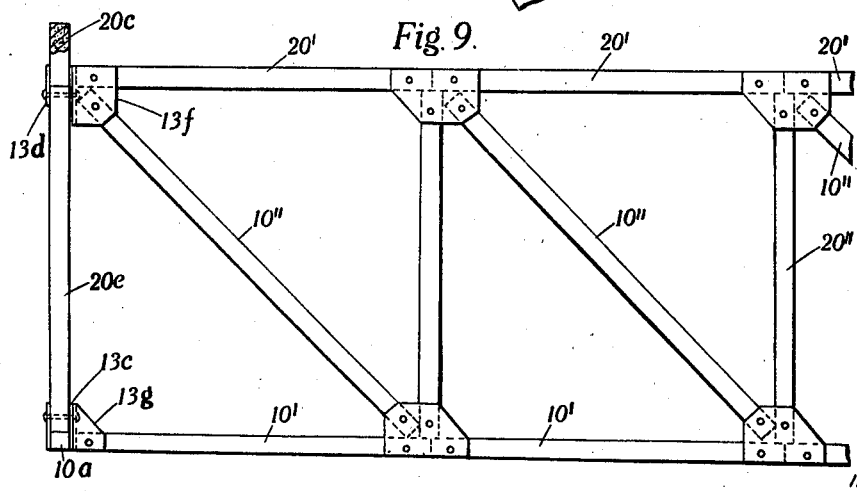
Figure 9 is a diagram illustrating a lattice girder of the N type, according to this invention.

In a lattice girder of the N type, Fig. 9, the two horizontal members are built up from a plurality of interchangeable elements 10' and 20'. The uprights 20" between them are likewise constituted by interchangeable elements and so are the diagonals, and it will be appreciated that the uprights 20" and the top horizontal member are compression members, and the diagonals 10" and the bottom horizontal member are tension members. In such a structure all the elements forming the compression members may be interchangeable, but two different lengths of tension elements 10', 10" are necessary, one for the diagonals and the other for the bottom horizontal member.

Roof trusses according to this invention may be joined by longitudinal, triangulated girders according to the invention. For example, upright elements (e. g. 20e) in successive trusses may be joined by a girder such for example as that illustrated in Fig. 9. Thus the elements 20e of Fig. 6 may be identified with spaced elements 20" of Fig. 9, and plates may be bolted to the fish plates 13c, 13d to form fish plates 13f, 13g for the girder.

It will of course be appreciated that in some structures, certain elements may at one time be under tension and at another time under compression, according to the conditions of load.

It is within the scope of the invention to provide a range of elements of differing strengths but of the same dimensions, said differing strengths being achieved by an adjustment of the reinforcement.

I claim:

1. A triangulated lattice structure of reinforced concrete, comprising a plurality of separate preformed reinforced concrete elements connected together to form the desired triangles, some of which elements are adapted to take the tensile stresses and others the compressive stresses developed in the resultant structure when loaded, and connecting means connecting the elements together at the corners of the triangles.

2. A triangulated lattice structure, comprising elements forming the sides of the triangles and connected together at the corners of the triangles, each of which elements is of reinforced concrete and has at least one cast-in tube transfixing it at each end, and connecting means for connecting the ends of the elements together, which means comprises metal members extending through said tubes.

3. A triangulated lattice structure, comprising elements forming the sides of the triangles and connected together at the corners of the triangles, each of which elements is of reinforced concrete and has at least one cast-in tube transfixing it at each end, and connecting means for connecting the ends of the elements together, which means comprises metal plates each lying alongside a plurality of the elements and members extending through the tubes and securing the plates to said elements.

4. A structure according to claim 2, wherein each element has at least one metal reinforcement rod extending longitudinally of it and bent around the tubes.

5. A triangulated lattice structure, comprising a plurality of separate preformed reinforced concrete elements pin jointed together to form the sides of the triangles, and pin-jointing means for forming pin joints between the elements at the corners of the triangles.

6. A built-up structure substantially wholly of reinforced concrete, comprising a plurality of elongated preformed reinforced concrete elements each forming a side of at least one plural-sided closed figure and each having a cast-in tube transfixing it at each end and metal reinforcement connecting the tubes at its opposite ends, gusset plates for connecting the ends of said elements at the corners of each figure, and securing means extending through said tubes for securing the gusset plates to the elements.

7. A built-up triangulated structure, comprising a plurality of separate elongated preformed reinforced concrete elements, including tension elements and compression elements, disposed each to form a side of at least one triangle, each of which elements has at least one cast-in tube transfixing it at each end and metal reinforcement connecting the tubes at its opposite ends, wherein the reinforcement on each compression element consists of metal rod bent around the tubes and extending as two laps between them which laps approach one another locally adjacent to each tube, and means, including metal members extending through the tubes, for connecting the elements together at the corners of the triangles.

8. A built-up triangulated structure, comprising a plurality of separate elongated elements each forming a side of at least one triangle, each of which elements is of reinforced concrete, has a cast-in metal jointing member transfixing it at each end, and has longitudinal metal reinforcement connecting the jointing members at its opposite ends, and connecting members engaging said jointing members and connecting the elements together at the corners of the triangles.

9. A built-up structure substantially wholly of reinforced concrete, comprising a plurality of elongated preformed reinforced concrete elements, each forming a side of at least one plural-sided closed figure and each having a cast-in metal jointing member transfixing it at each end and metal reinforcement members connecting the jointing members at its opposite ends; and connecting means at the corners of the figures each engaging jointing members of a plurality of the elements and thereby connecting said elements together.

10. A built-up structure substantially wholly of reinforced concrete, comprising a plurality of elongated preformed reinforced concrete elements disposed in angular relation one to another and each having a cast-in metal tube transfixing it at each end and metal reinforcement members extending within it and connecting the tubes at its opposite ends; gussets for connecting the ends of said elements in their angular relation; and securing means extending through the tubes for securing the gussets to the elements.

11. A built-up structure substantially wholly of reinforced concrete, comprising a plurality of elongated preformed reinforced concrete elements at least some of which are interchangeable, each having a cast-in tube permanently transfixing it at each end and metal reinforcement members extending within it and connecting the tubes at its opposite ends; and jointing means connecting ends of the elements in the desired structure, which jointing means comprises spaced plate members between which the ends of the elements are located and securing means extending through the plate members and through the tubes.

ARTHUR G. RUSSELL.